(12) United States Patent
Nami

(10) Patent No.: US 6,832,039 B1
(45) Date of Patent: Dec. 14, 2004

(54) PLAYBACK EQUIPMENT

(75) Inventor: Katsushi Nami, Tokyo (JP)

(73) Assignee: Digital Wave Corporation, Tokyo (JP)

(*) Notice: Subject to any disclaimer, the term of this patent is extended or adjusted under 35 U.S.C. 154(b) by 0 days.

(21) Appl. No.: 09/276,789

(22) Filed: Mar. 26, 1999

(30) Foreign Application Priority Data

Nov. 16, 1998 (JP) .......................... 10-324738
Dec. 18, 1998 (JP) .......................... 10-360212

(51) Int. Cl.$^7$ .............................................. H04N 5/91
(52) U.S. Cl. ........................................ 386/69; 386/70
(58) Field of Search ................ 386/6–8, 45, 54–55, 386/69–70, 95, 97, 125–126; 340/825.22, 825.24, 825.25, 825.69; 360/69; 369/32; 348/734

(56) References Cited

U.S. PATENT DOCUMENTS

| 5,546,365 | A |   | 8/1996  | Roth |           |
|-----------|---|---|---------|------|-----------|
| 5,740,304 | A |   | 4/1998  | Katsuyama et al. |  |
| 5,771,334 | A | * | 6/1998  | Yamauchi et al. | 386/95 |
| 6,067,282 | A | * | 5/2000  | Moriyama et al. | 386/97 |
| 6,085,020 | A | * | 7/2000  | Saito et al. | 386/55 |
| 6,130,624 | A | * | 10/2000 | Guyer | 340/825.69 |
| 6,466,734 | B2 | * | 10/2002 | Yuen et al. | 386/83 |

FOREIGN PATENT DOCUMENTS

| EP | 0 724 264 A2 | 7/1996 |
| EP | 0 903 744 A2 | 3/1999 |
| WO | WO 00/04539 | 1/2000 |

* cited by examiner

*Primary Examiner*—Thai Tran
*Assistant Examiner*—Christopher Onuaku
(74) *Attorney, Agent, or Firm*—Staas & Halsey LLP (57) ABSTRACT

A device for providing continuous access to a plurality of data, comprising a recording medium on which is recorded multiple data, each data having both a search address for hierarchical searches and a sub search address for direct searches, a search means for searching for desired data on the above recording medium using the sub search codes, a playback display means for playing back the found data, a sub search code storage means for storing multiple sub search codes in a desired sequence to allow playback in that sequence upon command, a means of reading the corresponding sub search code from the stored sequence of sub search codes for the next data to be played back in the sequence after the previous data in the sequence has been played back, and a control means for using the above playback and display means to playback the data which has been found on the recording medium using the sub search code read by the means described above.

3 Claims, 7 Drawing Sheets

PLAYBACK EQUIPMENT

BACKGROUND OF THE INVENTION

1. Field of the Invention

The present invention relates to a continuous playback equipment which can consecutively retrieve and playback multiple image or voice data recorded on DVD (digital video disk).

2. Description of the Prior Art

Many methods are employed for selling products, from store sales to direct mail sales. One widely used method is that of house-to-house sales. In this method, a sales person is first trained in knowledge of the product to be sold. The sales person then directly visits the prospective customer, gives an explanation of the product using samples, advertising and other materials, and concludes a sale agreement.

Recently, Japanese society has been ageing, and there exists a growing potential workforce consisting of the middle and old who have passed retirement age. Serious efforts are being focussed on utilizing this potential workforce in the field of house-to-house sales.

Middle or old-aged people are more suitable as house-to-house sales employees than younger people because they are more skilled at conversational face-to-face sales and they may have longer and more extensive knowledge of the products. On the other hand, younger sales people have the advantage with regard to understanding recent products, especially high-tech products, and in training in product operating methods. To counter these weaknesses, it has recently become common to use DVDs, with their better sound and image quality compared to CDs, to help when providing explanations of products to customers during home visits. The DVDs can contain detailed information including still photographs of the entire product range, together with videos showing product functions and operation. The sales person carries a portable DVD player and uses this to recall exact and detailed data from the DVD concerning any product which interests the customer. This has greatly improved the effectiveness of house-to-house sales.

For a DVD compiled for use in product explanations for house-to-house sales, if for example one DVD is set as a single volume, the saved titles are classified using an upper order product category (home electrical appliance, office automation equipment, food product, furniture, etc.), and the titles contain data such as product photo and handling method, with specific subtitles attached.

When the sales person pays a sales call on the customer, the sales person carries with them a DVD as described above, mounted in a portable recording and playback equipment. During the sales talk images of the desired product and illustrations of its functions can be recalled and played back to the customer. In conventional recording and playback equipment used for this purpose, it is necessary to first skip the volume selection screen, then show the title name display, and then select the desired title from this display. When this is done, the screen shows a long list of all the subtitles included in the selected title. The sales person then selects the desired item from the list of subtitles and the screen for the selected subtitle can be displayed. However, in conventional DVD recording and playback equipment, when the sales person wished to display an image, a specified playback procedure had to be followed and two selection screens had to be navigated before the image was finally displayed, a procedure which took some minutes. In the course of a sales presentation where the customer has become interested in a certain product or feature and is considering making a purchase, if it takes some minutes to recall the desired image, the customer's enthusiasm will decrease and the sales opportunity might be lost.

The present invention seeks to eliminate the weakness described above by allowing a desired image to be instantly recalled and displayed on a portable DVD recording and playback equipment by a sales person making a house call. Furthermore, for this multiple file continuous recall equipment, a DVD recording and playback equipment is used which can provide a continuous sequential display of prerecorded files consisting of units of single movie screens or a sequence of movie screens.

SUMMARY OF THE INVENTION

In order to achieve the objective of the present invention as described above, the present invention is a recording and playback equipment having a recording medium in which a plurality of data recordings have search addresses attached hierarchically, and where the desired data is searched for using a means for searching sequentially in hierarchical order for each level. The equipment can continuously play back a plurality of data, using a recording medium on which are recorded a plurality of data to which are attached sub search codes for direct searches, in addition to search addresses for hierarchical searches. A means is provided for searching for the desired data on the said recording medium using sub search codes; there is a means for playing back and displaying the found data; a means for saving a plurality of sub search codes in a preset sequence for the purpose of playing back such a preset sequence of data; a means for recalling the sub search code for the next item of data in the preset playback sequence after an item of data has been played back using its recalled sub search code; and a means for controlling the playback display using the abovementioned playback display means, of the data found on the said recording medium by using the sub search code for that data.

Second of the present invention refers to a playback equipment according to above present invention, wherein the said sub search code storage means is incorporated in the recording and playback equipment itself.

Third of the present invention refers to a playback equipment according to above present invention, wherein the said sub search code storage means is incorporated in an external remote control device used for remotely controlling the recording and playback equipment.

Fourth of the present invention refers to a playback equipment according to above present invention, wherein the abovementioned recording medium is a DVD disk.

Fifth of the present invention refers to a playback equipment according to above present invention, wherein the said sub search code is input using an input device attached to the recording and playback equipment.

Sixth of the present invention refers to a playback equipment according to above present invention, wherein the said sub search code is input using an input device attached to the external remote control device used for remotely controlling the recording and playback equipment.

Seventh of the present invention refers to a playback equipment according to above present invention, wherein an SR button is provided to select the search operation using the sub search code.

DESCRIPTION OF THE PREFERRED EMBODIMENTS

Figure 1:
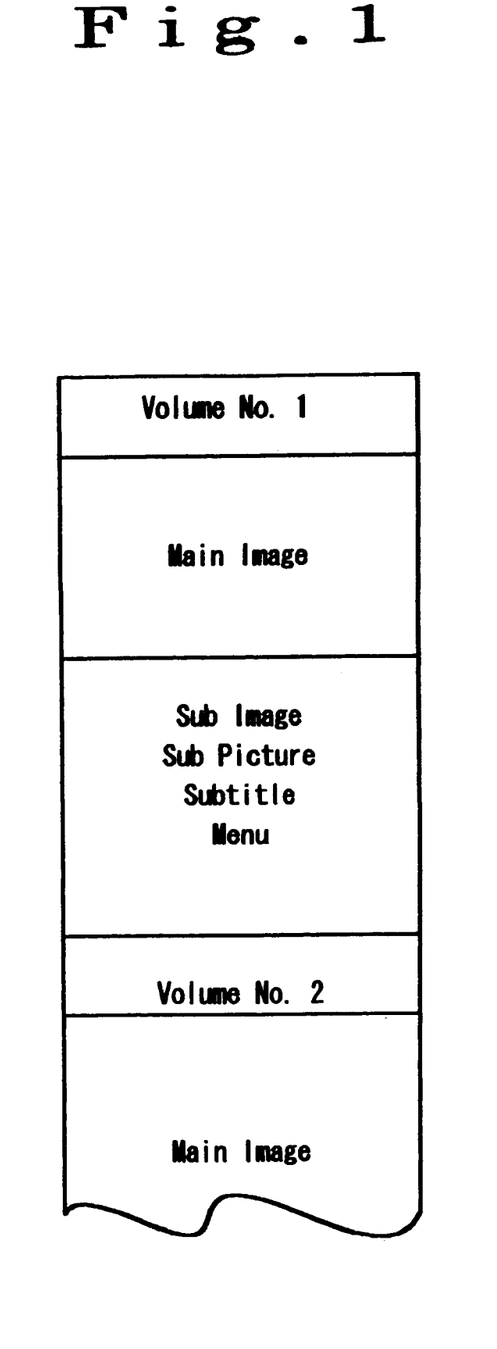
FIG. 1 is an explanatory diagram showing the recording structure of the recording medium used by the present invention.
Figure 2:
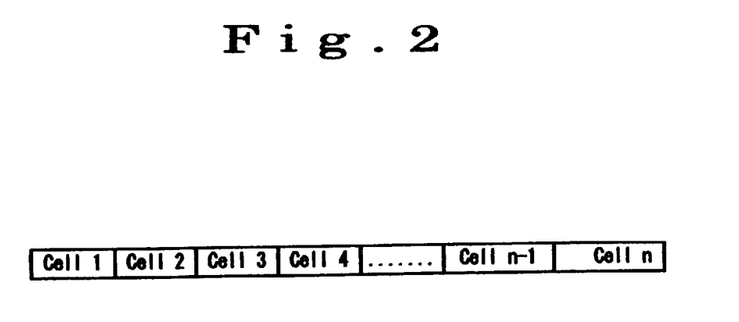
FIG. 2 is an explanatory diagram showing the recording structure of the main image section.

The first embodiment of the present invention will be described with reference to the explanatory diagrams. FIG. 1 is a structural diagram showing the recording structure of a DVD. The upper layer of the recording structure contains volume recording section 1. This volume 1 can set multiple volumes, in the same way as a computer hard disk. In the lower layer of the volume level is the main image recording section 2. As shown in FIG. 2, the main image recording section 2 is divided into individual cells, and these cells have sequential cell numbers, for example from 1 to n, showing the playback sequence of their data. Within each cell, the smallest units of image signals, voice signals, etc., are divided into multiple channels and saved in compressed MPEG format.

Returning to the explanation of FIG. 1, in addition to main image recording section 2, the DVD disk also contains sub image recording section 3. Sub image recording section 3 is so called because it is used for recording sub data related to the main data in main image recording section 2. Sub image recording section 3 can contain data such as translation subtitles to be superimposed on the main image, and contains a menu section to hold data created by the user, for example for making screens to provide help for subsequent recording and playback operations, or for saving programs to execute sequences, etc.

A DVD normally contains up to a maximum of 32 tracks for recording subtitles, which means that subtitles can be recorded in up to 32 different languages, or these tracks can be used for other explanatory contents.

The screen display based on the data in the above menu section contains 2 menus: a system menu and a title menu. The system menu can be displayed at the start of disk playback and during pauses or playback. Selecting a title, etc. from those displayed on the system menu causes the recording and playback equipment to operate in accordance with the menu selection. The title menu displays the subtitles on the screen during playback, and these can be selected.

Figure 3:
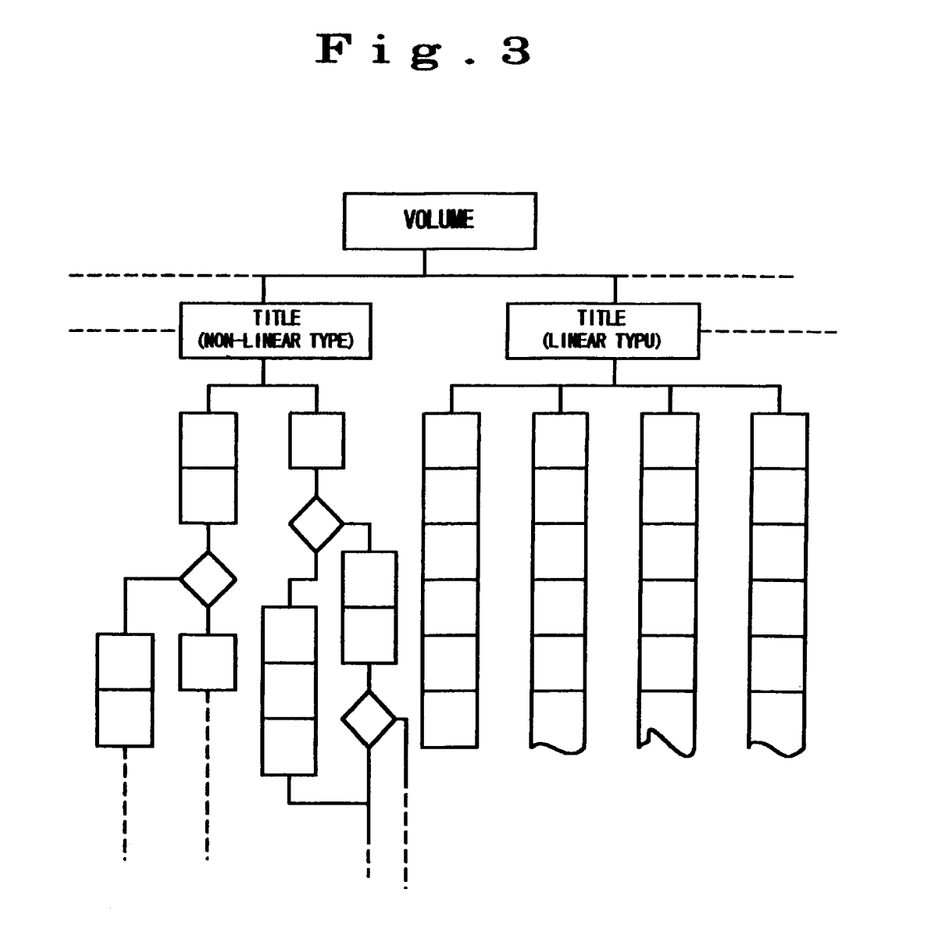
FIG. 3 is a hierarchical diagram showing the hierarchical structure of a recording in the present invention

The hierarchical recording structure of the DVD, as shown in FIG. 3, has the volume level as its uppermost layer. The volume layer is necessary when the DVD disk is used as a computer DVD-ROM, but in normal use for image recording a disk is treated as a single volume and it is not necessary to pay attention to this layer.

In the layer below the volume level is the title level. Multiple titles can be stored in the title level. These titles may be of two types: non linear titles or linear titles. If the selected title is a linear type, cells are played back according to their preset sequence. If the selected title is a non-linear type, it is possible for example to select a desired playback route during playback, according to the selection saved in sub image recording section 3.

In the DVD playback operations described so far, pressing a button on the recording and playback equipment itself or on a remote control device will display a screen with a menu allowing a multiple choice of titles. When the desired title is selected from those displayed, the screen changes and the image data subtitles included in the titles are listed. When the desired item is selected, the selected still or moving image is played back. The above description is the conventional way of performing this operation, and considerable time is required before the desired image is played back. This invention adds the means described below to allow instantaneous recall of desired data from a DVD recorded using the conventional recording format.

Each title stored in the sub image storage area 3 of the DVD disk is allotted a 2 digit serial number. This serial number is written together with the search address used for searching for titles, and used as the upper 2 digits of the abbreviated address. This is referred to as the upper sub search code. In addition, a 2 digit serial number is also attached to each sub title (the smallest unit for each displayed image) within each title. This serial number is written together with the search address used for searching for subtitles within titles, and used as the lower 2 digits of the abbreviated address. This is referred to as the lower sub search code. The combination of upper and lower sub search codes is referred to as the sub search code.

The recording and playback equipment for playing back the images on the DVD disk, in addition to a program for playing normal DVD disks, includes a direct access program (a means for directly accessing the data recorded on the recording medium, using specified abbreviated addresses) whereby when a 4 digit sub search code is entered, by means of serial number input buttons either on the recording and playback equipment or on a remote control unit, the upper 2 digits and lower 2 digits of the 4 digit serial number are used to cause the laser pickup to access the desired location on the DVD, with the upper 2 digits indicating the title and the lower 2 digits indicating the sub title.

In the present invention, if a plurality of sub search codes are preset corresponding to the image or audio data which it is desired to playback automatically and continuously, then during playback these sub search codes are recalled automatically in the set sequence and the data corresponding to these codes is played back continuously in that sequence.

Figure 4:
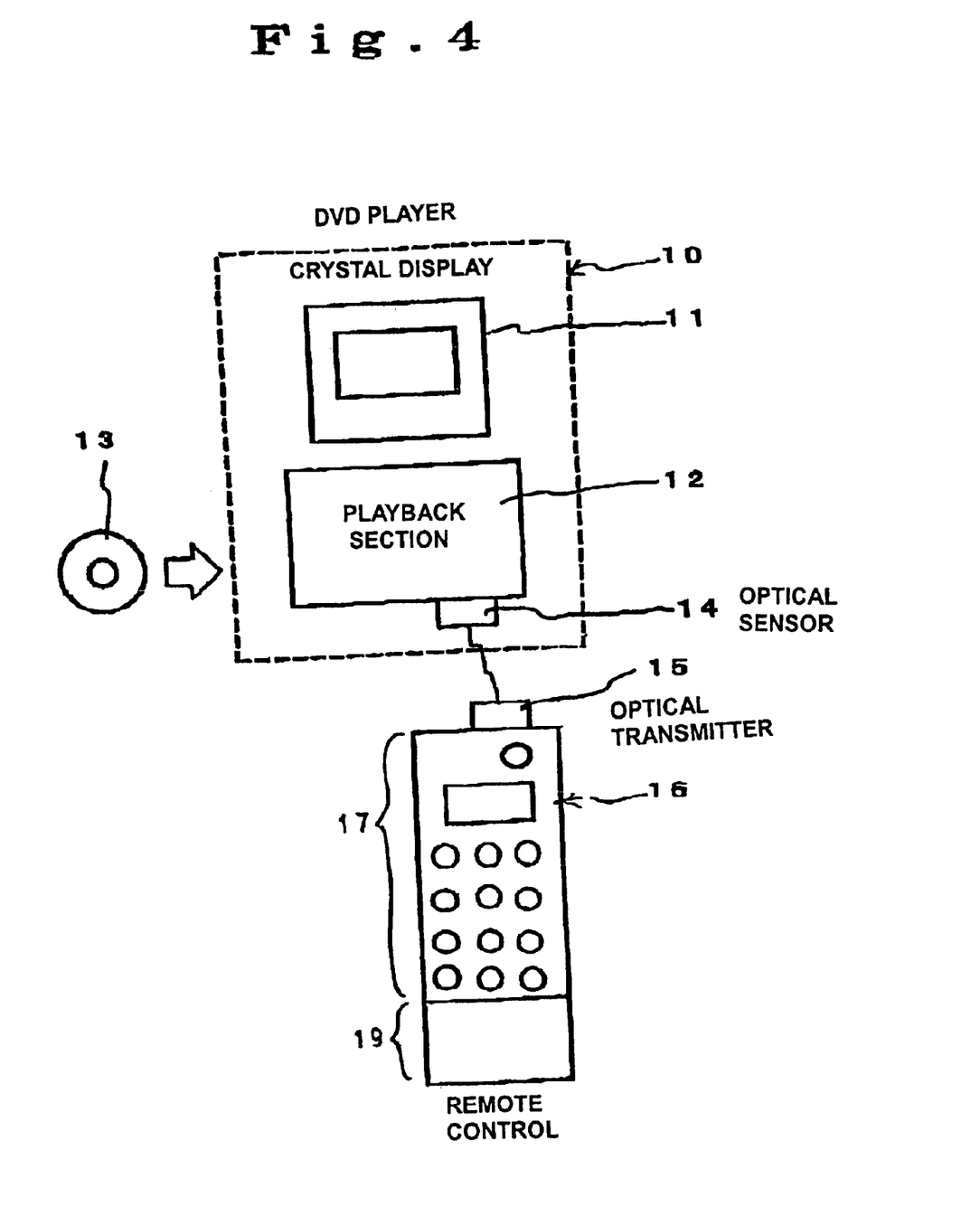
FIG. 4 is a block diagram showing the configuration of the present invention.

FIG. 4 shows a block diagram of the equipment for continuously playing back multiple files described in the present invention. In FIG. 4, numeral 10 denotes the DVD player. DVD player 10 has a TFT liquid crystal color display 11, and a playback section 12 for playing the DVD disk 13. Playback section 12 includes a device for rotating the DVD disk, a laser pickup for reading data from the DVD, a device for moving the laser pickup, a pickup control device for controlling the movement of the laser pickup, a device for playing the data read from the DVD, an optical sensing device 14.

Figure 5:
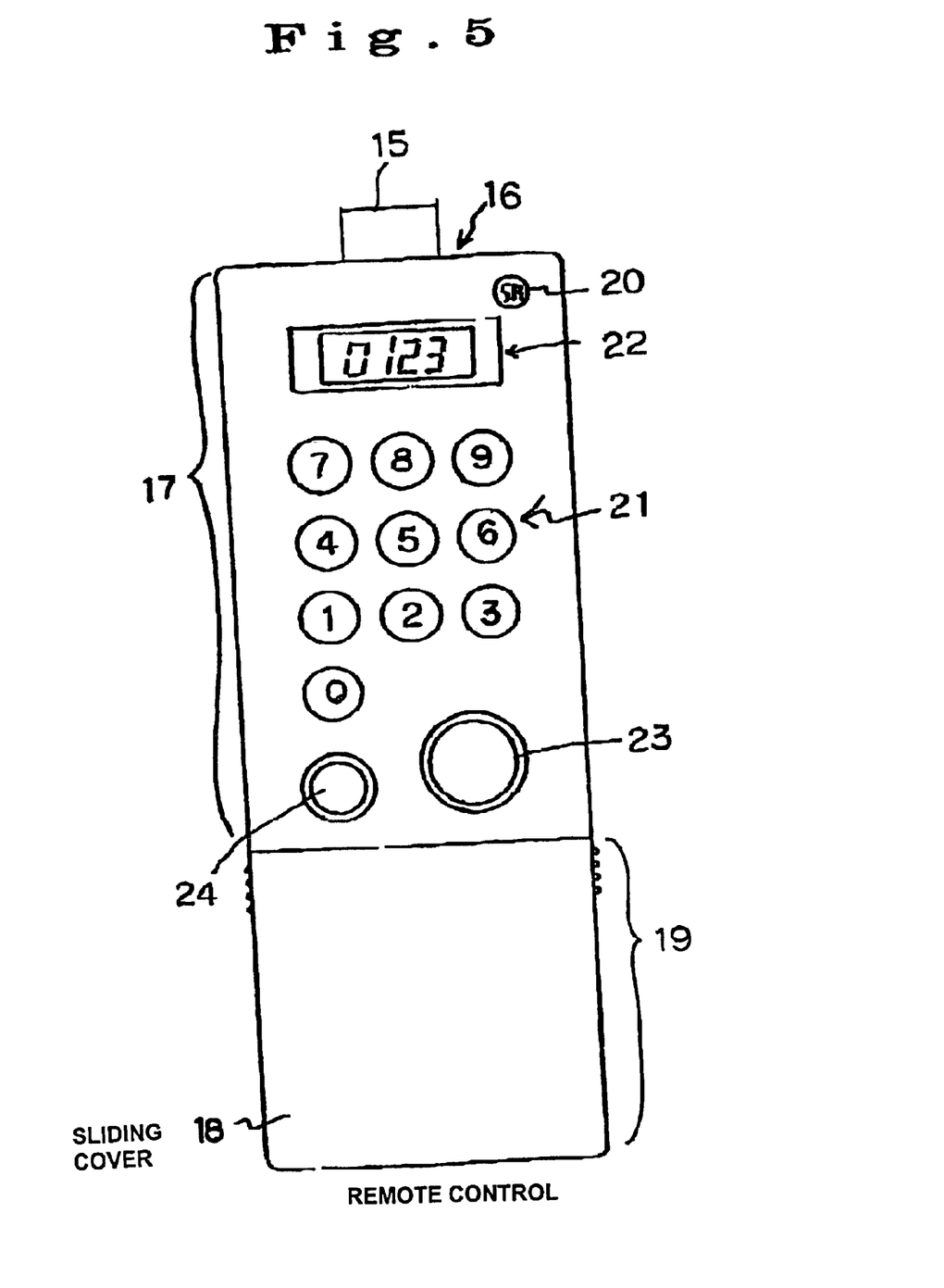
FIG. 5 is a front view of the remote control device.
Figure 6:
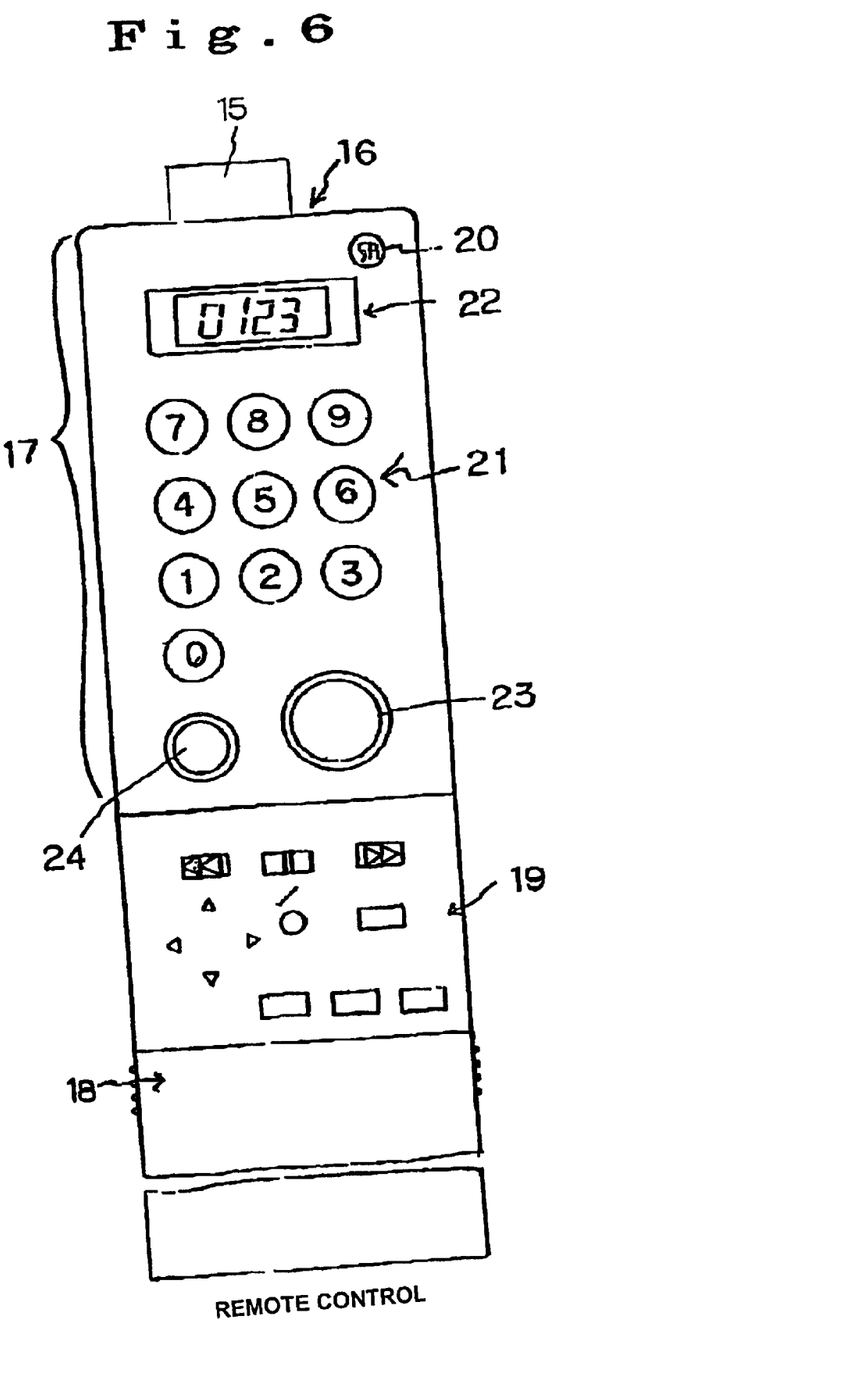
FIG. 6 is a front view of the remote control device with its cover open.

Numeral 16 denotes the remote control unit. Remote control unit 16 includes an optical transmitting device 15 for sending command signals to the optical sensing device 14 on playback section 12. The remote control unit 16 has a memory for storing the input sub search codes. In addition, as described above, there is incorporated a means of directly assessing the data on the DVD using specified abbreviated addresses, this means including an access program which finds the title corresponding to the upper 2 digits of the address and the subtitle within the title which corresponds to the lower 2 digits of the address, and uses this information to cause the laser pickup to access the desired data at the correct location on the DVD. FIG. 5 shows the front view of remote control unit 16. As can be seen from FIG. 5, remote control unit 16 comprises an upper operating section 17 and a lower operating section 19, which in this figure is concealed by a sliding cover 18. FIG. 6 shows the lower operating section 18 with the cover 18 opened.

At the top right of upper operating section 17 there is a button 20 marked SR which is used to directly access the DVD by means of sub search codes. Arranged in the center of the unit are the serial number input buttons 21, and above them, a liquid crystal display 22 for showing the 4 digits of the input serial numbers. These is also a start button 23, used to send the input serial number, to begin the search operation, etc., and a stop button 24 used to cancel operations, for example to stop a playback in progress. The lower operating section 19 comprises various buttons for controlling the DVD player.

The DVD player 10 of the present invention has above-mentioned structures and other structures are approximately similar to the thing as shown in the U.S. Pat. No. 6,067,282.

Next, the operation of setting the sub search codes for automatic continuous playback will be described.

Figure 7:
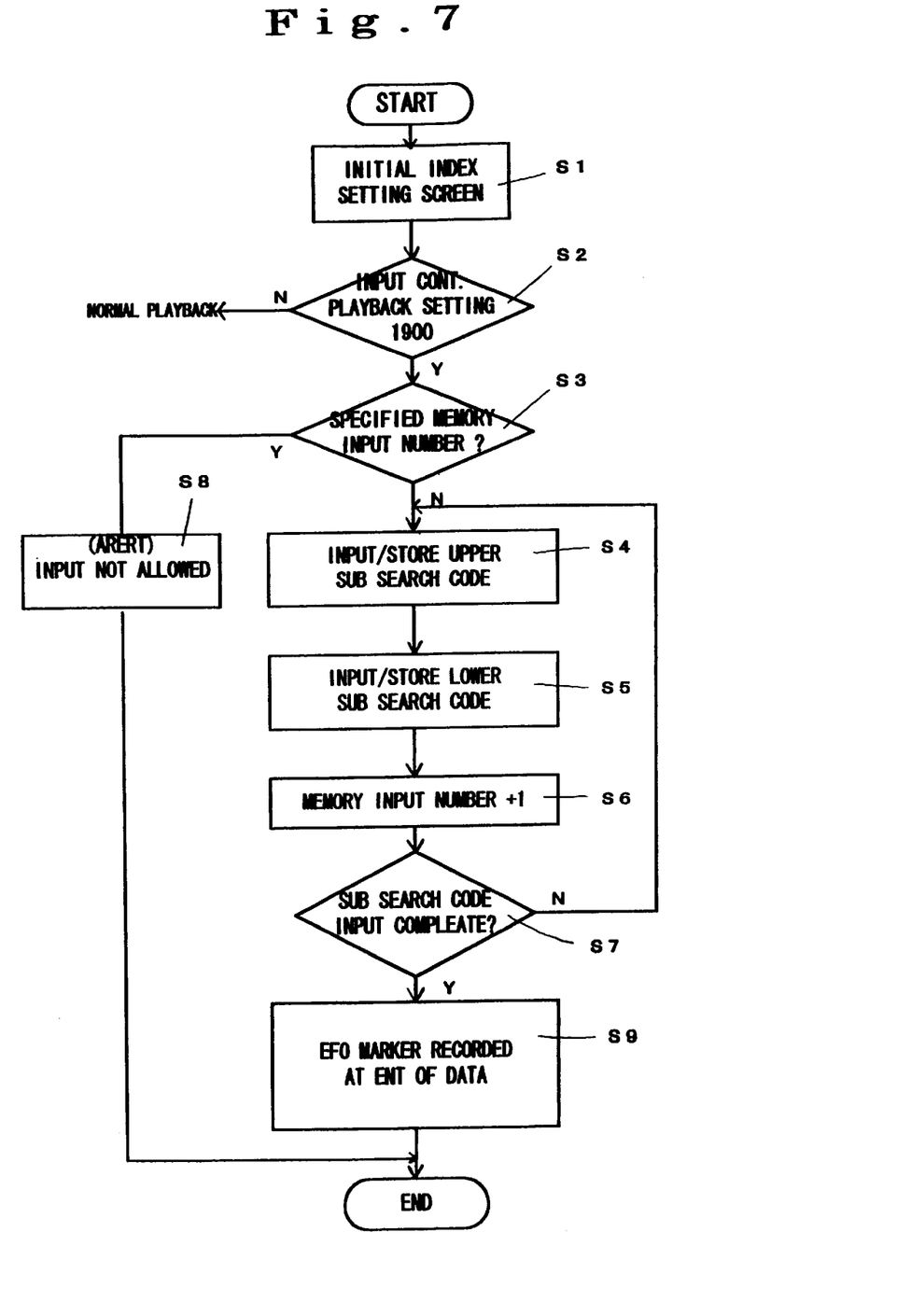
FIG. 7 is a flow chart showing the operations for setting the sub search code.

FIG. 7 is a flow chart showing the operations for setting the sub search code. First, the power switch is turned on, and the player in the operating condition is made ready for the sales presentation by inserting a DVD containing the sales data. The auto set start function is activated, and as shown in step S1 of FIG. 7, the initial index setting screen is read from the DVD and displayed. This DVD, made specially for sales presentation use, is different from normal commercial DVD media, and from this initial index setting screen the SR button 20 can be used to directly input the sub search codes for direct access. When SR button 20 is pressed at step S1, the screen changes to a screen for setting continuous playback on or off. To set continuous playback off, stop button 24 is pressed, and the screen reverts to the normal display. To set continuous playback on, the serial number input buttons 21 on remote control unit 16 are used to input "1900" which is the 4 digit code for setting continuous playback, and the procedure moves on to step S3.

In this step, the contents of the memory in which are recorded the number of times for continuous playback are read, and a decision is made as to whether this number exceeds the specified number or not. If for example the specified value is 5 times, a number in excess of this cannot be set, and if such a number is input the flow moves to step S8, the screen indicates that numbers greater than this cannot be input, and the flow skips the settings for continuous playback. If continuous playback is possible, the flow moves to step S4, in which the serial number input buttons 21 are used to input the upper 2 digits of the sub search code corresponding to the first image or audio data file it is desired to display automatically, and then the start button is pressed.

The flow now moves to step S5, in which the serial number input buttons 21 are used to input the lower 2 digits of the sub search code corresponding to the first image or audio data file it is desired to display automatically, and then the start button is pressed. By this operation, the 4 digit sub search code for the data it is desired to display are stored in the first address of the memory in the DVD player 12, and at the same time, a 1 is stored in the storage number memory inside this memory (step S6).

In step S7, it is determined whether or not the operator has pressed stop button 24. If stop button 24 has not been pressed, the program waits for input of the next sub search code. When one of the number keys of the serial number input buttons is pressed, the flow follows route N and returns to step S4, in which the serial number input buttons 21 are used to input the upper 2 digits of the sub search code corresponding to the second image or audio data file it is desired to display, and then the start button is pressed. The flow then moves to step S5, in which the serial number input buttons 21 are used to input the lower 2 digits of the sub search code corresponding to the second image or audio data file it is desired to display, and then the start button is pressed. By this operation, the 4 digit sub search code for the data it is desired to display is stored in the second address of the memory in the DVD player 12, and at the same time, 1 is added to the storage number memory inside this memory (step S6). This brings the value of the memory input number to 2.

The above operation is repeated until the desired number of data, for example 5, is input, and then at step S7, the stop button 24 is pressed which moves the flow to step S9. In this step, a code indicating the end of the data, for example EOF, is added to the end of the final sub search code stored in the memory, and the sub search code input flow is exited.

If it is not necessary to input a number of sub search codes to the limit of the memory, the operator can end the input of sub search codes at step S7 by input from the remote control unit 16 as described above. This operation consists of pressing the stop button 24. This operation moves the flow to step S9, in which a code indicating the end of the data, for example EOF, is added to the end of the final sub search code stored in the memory, and the sub search code input flow is exited.

Figure 8:
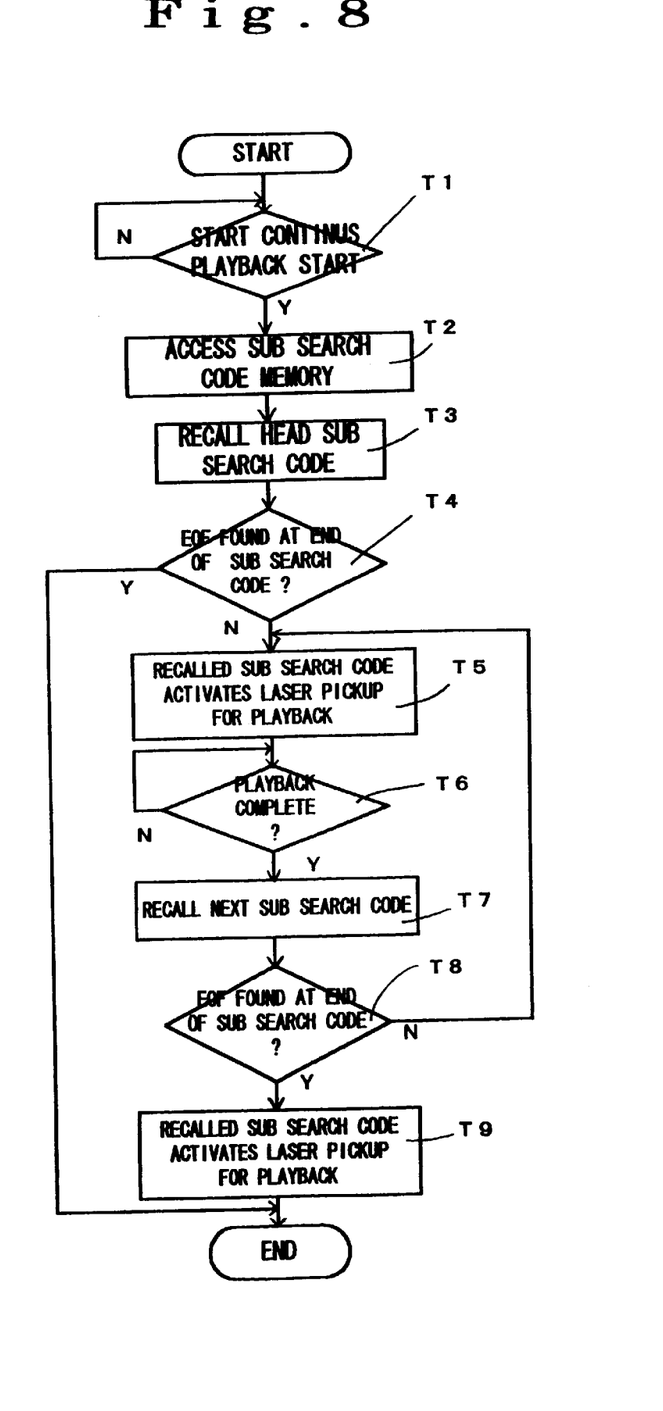
FIG. 8 is a flow chart showing the operations for playing back data using a saved sub search code.

Next, the process of recalling the multiple sub search codes input consecutively and stored, moving the laser pickup to the corresponding addresses and automatically playing back the files, will be described with reference to FIG. 8.

After multiple sub search codes have been input and the setting is complete, the equipment waits for the start of continuous playback. In step 1, continuous monitoring is performed to check whether or not start button 23 of remote control unit 16 has been pressed. When start button 23 is pressed to commence continuous playback, the flow moves to step T2 which accesses the sub search code memory. In step T3, the first sub search code is read, and step T4 checks to see if the end of file marker EOF is attached to the end of this sub search code. If EOF is detected, the flow stops. If there is no EOF, the flow moves to step T5. This step executes a program to move the laser pickup to the desired location to access the file corresponding to the title indicated by the upper 2 digits of the sub search code and the subtitle indicated by the lower 2 digits.

Step T5 moves the laser pickup to the desired location and begins playback. Step T6 checks at specified intervals to see whether or not the playback operation has been completed. When playback of the data recalled by the first sub search code is complete, the flow moves from step T6 to step T7, and the second sub search code is read. In step T8, if there is no EOF attached to the end of the read sub search code, the flow returns to step T5, and the program executed to move the laser pickup to the desired location to access the file corresponding to the title indicated by the upper 2 digits of the sub search code and the subtitle indicated by the lower 2 digits.

Step T5 moves the laser pickup to the desired location and begins playback. Step T6 checks at specified intervals to see whether or not the playback operation has been completed. When playback of the data recalled by the second sub search code is complete, the flow moves from step T6 to step T7, and the third sub search code is read. In step T8, if there is no EOF attached to the end of the read sub search code, the flow returns to step T5, and the procedure is repeated for the file indicated by the third sub search code. In this way the files are read out consecutively and displayed. When step T8 detects an EOF at the end of a sub search code, it is recognized that this is the last file to be read out and the flow moves to step T9, exiting the playback execute flow.

The present invention has been described in terms of the above embodiment but another possible embodiment is for the memory used as a means of storing the sub search codes to be installed in the remote control unit instead of in the recording and playback equipment as described above. Other possible embodiments include the use of an input means involving both the remote control unit and the recording and playback equipment, or a means by which either can be used. Within the range of the gist of this invention various embodiments are possible, and such embodiments are not excluded from the scope of the present invention.

As described above in detail, the present invention provides a recording and playback equipment having a recording medium in which a plurality of data recordings have search addresses attached hierarchically, where the desired data is searched for using a means for searching sequentially in hierarchical order for each level, an equipment for continuously playing back a plurality of data, with a recording medium on which are recorded a plurality of data to which are attached sub search codes for direct searches, in addition to search addresses for hierarchical searches, and a means for searching for the desired data on the said recording medium using sub search codes, a means for playing back and displaying the found data, and a means of saving a plurality of sub search codes in a preset sequence for the purpose of playing back such a preset sequence of data, a means for recalling the sub search code for the next item of data in the preset playback sequence after an item of data has been played back using its recalled sub search code, and a means for controlling the playback display using the above-mentioned playback display means, of the data found on the said recording medium by using the sub search code for that data. The sales person making a home visit with such a portable recording and playback equipment can instantly cause the equipment to display any desired data, as a single frame or as a movie, in any preset consecutive sequence desired.

What is claimed is:

1. A playback equipment having a recording medium in which a plurality of data recordings have search addresses attached hierarchically, where the desired data is searched for using a means for searching sequentially in hierarchical order for each level, an equipment for continuously playing back a plurality of data, comprising:

a recording medium on which are recorded a plurality of data to which are attached sub search codes for direct searches, in addition to search addresses for hierarchical searches;

means for searching for the desired data on the said recording medium using sub search codes;

means for playing back and displaying the found data;

means for sub search code storage which is incorporated in an external portable remote control device provided with a wireless connection to the playback equipment used interactively to remotely control the playback equipment, for saving a plurality of sub search codes in a preset sequence for the purpose of playing back such a preset sequence of data;

means for recalling the sub search code for the next item of data in the preset playback sequence after an item of data has been played back using its recalled sub search code; and means for controlling said means for playing back and displaying the found data which is found on the recording medium by using the sub search code for that data, wherein the said sub search code is input using an input device attached to the external remote control device used for remotely controlling the playback equipment.

2. A playback equipment according to claim 1, wherein the said sub search code is input using a portable remote control device attached to the playback equipment.

3. A playback equipment having a recording medium in which a plurality of data recordings have search addresses attached hierarchically, where the desired data is searched for sequentially in hierarchical order for each level, an equipment for playing back a plurality of data, comprising:

a recording medium on which are recorded a plurality of data to which are attached sub search codes for direct searches, in addition to search addresses for hierarchical searches;

the playback equipment searching for the desired data on the said recording medium using sub search codes and playing back and displaying the found desired data;

an external portable remote control device provided with a wireless connection to the playback equipment and used interactively to remotely control the playback equipment, and saving a plurality of sub search codes in a preset sequence for the purpose of playing back such a preset sequence of data;

the playback equipment recalling the sub search code for the next item of data in the preset playback sequence after an item of data has been played back using its recalled sub search code; and the playback equipment controlling the playing back and displaying the found data which is found on the recording medium by using the sub search code for that data, wherein the said sub search code is input using an input device attached with the external remote control device used for remotely controlling the playback equipment.

* * * * *